US012284467B2

United States Patent
White et al.

(10) Patent No.: US 12,284,467 B2
(45) Date of Patent: Apr. 22, 2025

(54) OPTICAL NETWORK CONFIGURATION

(71) Applicant: BRITISH TELECOMMUNICATIONS PUBLIC LIMITED COMPANY, London (GB)

(72) Inventors: Catherine White, London (GB); Neil Parkin, London (GB)

(73) Assignee: British Telecommunications Public Limited Company, London (GB)

( * ) Notice: Subject to any disclaimer, the term of this patent is extended or adjusted under 35 U.S.C. 154(b) by 196 days.

(21) Appl. No.: 18/006,468

(22) PCT Filed: Jun. 29, 2021

(86) PCT No.: PCT/EP2021/067800
§ 371 (c)(1),
(2) Date: Jan. 23, 2023

(87) PCT Pub. No.: WO2022/017735
PCT Pub. Date: Jan. 27, 2022

(65) Prior Publication Data
US 2023/0353911 A1  Nov. 2, 2023

(30) Foreign Application Priority Data
Jul. 23, 2020 (GB) .................................... 2011384

(51) Int. Cl.
*H04Q 11/00* (2006.01)
*H04B 10/25* (2013.01)

(52) U.S. Cl.
CPC ......... *H04Q 11/0062* (2013.01); *H04B 10/25* (2013.01); *H04Q 2011/0079* (2013.01)

(58) Field of Classification Search
None
See application file for complete search history.

(56) References Cited

U.S. PATENT DOCUMENTS

| 6,763,195 B1 | 7/2004 | Willebrand et al. |
| 7,697,547 B2 | 4/2010 | Diouf et al. |

(Continued)

FOREIGN PATENT DOCUMENTS

| CN | 101394231 A | 3/2009 |
| CN | 110808811 A | 2/2020 |

(Continued)

OTHER PUBLICATIONS

Combined Search and Examination Report under Sections 17 and 18(3) for Great Britain Application No. 2011384.1, mailed on Jan. 13, 2021, 9 pages.

(Continued)

*Primary Examiner* — David W Lambert
(74) *Attorney, Agent, or Firm* — EIP US LLP

(57) ABSTRACT

An optical network including an optical splitter configured to split an optical signal incident on the optical splitter into at least a control signal and a data signal; an optical switch; a first optical path configured to carry the control signal between the optical splitter and the optical switch; and a second optical path configured to carry the data signal between the optical splitter and the optical switch. The optical network is configured to transmit the control and data signals such that the data signal is incident on the optical switch after the control signal. The optical switch is configured to selectively switch the optical network between a first configuration and a second configuration in accordance with the control signal.

27 Claims, 5 Drawing Sheets

(56) References Cited

U.S. PATENT DOCUMENTS

| | | |
|---|---|---|
| 7,876,794 B2 | 1/2011 | Kakui |
| 9,154,220 B2 | 10/2015 | Sugawara et al. |
| 10,200,132 B2 | 2/2019 | Sone et al. |
| 10,560,184 B2 | 2/2020 | Johansson et al. |
| 2002/0027686 A1 | 3/2002 | Wada et al. |
| 2003/0036213 A1 | 2/2003 | Brophy |
| 2012/0246368 A1 | 9/2012 | Kwon et al. |
| 2012/0275783 A1 | 11/2012 | Kitajima et al. |
| 2013/0195447 A1 | 8/2013 | Ashwood-Smith |
| 2015/0289035 A1 | 10/2015 | Mehrvar et al. |

FOREIGN PATENT DOCUMENTS

| | | | | |
|---|---|---|---|---|
| CN | 110933533 A | 3/2020 | | |
| EP | 1126740 A2 * | 8/2001 | ............. | H04L 49/25 |
| EP | 1187508 A2 | 3/2002 | | |
| EP | 2037597 A1 | 3/2009 | | |
| JP | 2006166464 A | 6/2006 | | |

OTHER PUBLICATIONS

Examination Report under Section 18(3) for Great Britain Application No. 2011384.1, mailed on Nov. 25, 2022, 5 pages.

Griffith D., et al., "A +1 Protection Architecture for Optical Burst Switched Networks," IEEE Journal on Selected Areas in Communications, vol. 21, No. 9, Nov. 2003, pp. 1384-1398.

International Preliminary Report on Patentability for Application No. PCT/EP2021/067800, mailed on Nov. 18, 2022, 8 pages.

International Search Report and Written Opinion for International Application No. PCT/EP2021/067800, mailed on Oct. 4, 2021, 16 pages.

Written Opinion of the International Preliminary Examining Authority for Application No. PCT/EP2021/067800, mailed on Sep. 19, 2022, 22 pages.

* cited by examiner

OPTICAL NETWORK CONFIGURATION

PRIORITY CLAIM

The present application is a National Phase entry of PCT Application No. PCT/EP2021/067800, filed Jun. 29, 2021, which claims priority from GB Patent Application No. 2011384.1, filed Jul. 23, 2020, each of which is hereby fully incorporated herein by reference.

TECHNICAL FIELD

The present disclosure relates to optical networks, and more particularly to configuration of optical networks.

BACKGROUND

In optical networks, such as communications networks, optical signals may be transmitted by optical paths, such as optical fibers. The configuration of optical networks can be controlled using software defined networking (SDN). However, reconfiguring an optical network in this way is relatively slow. This can lead to data loss while the optical network is undergoing reconfiguration.

It is desirable to at least alleviate some of the aforementioned problems.

SUMMARY

According to a first aspect of the present disclosure, there is provided an optical network comprising: an optical splitter configured to split an optical signal incident on the optical splitter into at least a control signal and a data signal; an optical switch; a first optical path configured to carry the control signal between the optical splitter and the optical switch; and a second optical path configured to carry the data signal between the optical splitter and the optical switch, wherein: the optical network is configured to transmit the control and data signals such that the data signal is incident on the optical switch after the control signal; and the optical switch is configured to selectively switch the optical network between a first configuration and a second configuration in accordance with the control signal.

In some examples, the optical network comprises a third optical path configured to carry a duplicate of the data signal between the optical splitter and the optical switch, wherein: in the first configuration, a data transmission path for transmission of data from the optical splitter to a remote location in the optical network comprises the second optical path; and in the second configuration, the data transmission path comprises the third optical path instead of the second optical path. The optical switch may be configured to switch the optical network from the first configuration to the second configuration in response to the control signal indicating an anomaly in the data signal. The optical network may be configured to transmit the data signal and the duplicate of the data signal such that the duplicate of the data signal is incident on the optical switch after the data signal is incident on the optical switch. The optical network may be configured such that a switching time for switching the optical switch from a first state associated with the first configuration to a second state associated with the second configuration is less than a time difference between incidence of the control signal on the optical switch and incidence of the duplicate of the data signal on the optical switch. The optical network may comprise a bundle of optical fibers comprising a first optical fiber corresponding to the first optical path and a second optical fiber corresponding to the second optical path.

In some examples, the optical network is configured such that a switching time for switching the optical switch from the first configuration to the second configuration is less than a time difference between incidence of the control signal on the optical switch and incidence of the data signal on the optical switch.

In some examples, the optical signal is a first optical signal and the optical network comprises: a first transmitter configured to transmit the first optical signal, the optical splitter being arranged between the first transmitter and the optical switch; a second transmitter configured to transmit a second optical signal; a further optical path between the second transmitter and the optical switch; and an outgoing optical path between the optical switch and the remote location, wherein: in the first configuration, the optical network is configured to transmit at least a portion of the second optical signal to the remote location, via the further optical path and the outgoing optical path; and in the second configuration, the optical network is configured to transmit the data signal to the remote location, via the second optical path and the outgoing optical path. The optical switch may be configured to switch the optical network from the first configuration to the second configuration in response to the control signal indicating that use of the outgoing optical path is requested for transmission of the data signal. In some of these examples, the optical splitter is a first optical splitter, the data signal is a first data signal, the further optical path is a lower latency optical path, and the optical network comprises: a second optical splitter between the second transmitter and the optical switch, the second optical splitter configured to split the second optical signal into at least a second control signal and a second data signal; and a higher latency optical path having a higher latency than the lower latency optical path and being configured to carry the second control signal between the second optical splitter and the optical switch, wherein the lower latency optical path is configured to carry the second data signal between the second optical splitter and the optical switch. In some of these examples, the optical network comprises: a first photodetector associated with the first transmitter, the first photodetector configured to, with the optical network in the first configuration: detect a backscattered portion of the second data signal, backscattered at a second input port associated with the optical switch; and generate a signal, based on the backscattered portion of the second data signal, indicative that the second data signal is being carried by the outgoing optical path; and/or a second photodetector associated with the second transmitter, the second photodetector configured to, with the optical network in the second configuration: detect a backscattered portion of the first data signal, backscattered at a first input port associated with the optical switch, with the optical network in the second configuration; and generate a signal, based on the backscattered portion of the first data signal, indicative that the first data signal is being carried by the outgoing optical path.

In some examples, in the first configuration, the optical network is configured to transmit at least the portion of the second optical signal via the outgoing optical path without transmitting the data signal via the outgoing optical path; and/or in the second configuration, the optical network is configured to transmit the data signal via the outgoing optical path without transmitting at least the portion of the second optical signal via the outgoing optical path.

In some examples, the optical switch is a first optical switch, and the optical network comprises: a second optical switch; a first outgoing optical path configured to carry the control signal between the first optical switch and the second optical switch; and a second outgoing optical path configured to carry the data signal between the first optical switch and the second optical switch, wherein the optical network is configured to transmit the control and data signals such that the data signal is incident on the second optical switch after the control signal, and the first optical switch is configured to: route the control signal to the first outgoing optical path; and route the data signal to the second outgoing optical path.

In some examples, the optical network comprises a first outgoing optical path between the optical switch and a first remote location; and a further outgoing optical path between the optical switch and a further remote location, wherein: in the first configuration, the optical network is configured to transmit the data signal from the optical switch to the first remote location via the first outgoing optical path; and in the second configuration, the optical network is configured to transmit the data signal from the optical switch to the further remote location via the further outgoing optical path. In some of these examples, the second optical path comprises a first core of a first section of a multicore optical fiber, the first outgoing optical path comprises a first core of a second section of the multicore optical fiber, the further outgoing optical path comprises a second core of the second section of the multicore optical fiber, and the optical switch is operable to rotate the first section of the multicore optical fiber relative to the second section of the multicore optical fiber such that: in the first configuration, the first core of the first section of the multicore optical fiber is optically coupled to the first core of the second section of the multicore optical fiber; and in the second configuration, the first core of the first section of the multicore optical fiber is optically coupled to the second core of the second section of the multicore optical fiber.

In some examples, the optical network comprises a transmitter configured to: obtain an input signal comprising the data signal; and generate the optical signal by modifying the input signal to include the control signal.

In some examples, the optical switch is configured to selectively switch the optical network from the first configuration to the second configuration based on at least one of: a frequency of the control signal, an amplitude of the control signal, or a pulse code modulation associated with the control signal.

In some examples, the optical switch is configured to be powered by the control signal. In some of these examples, a change in a state of the optical switch is configured to be powered by the control signal, the state comprising at least one of: a mechanical state or a refractive index of the switch, such that the change in the state of the optical switch switches a configuration of the optical network from the first configuration to the second configuration.

In some examples, the optical switch comprises a switch which operates via at least one of: the piezo-optic effect, the large elasto-optic effect or the inverse large elasto-optic effect.

In some examples, the optical network comprises a light detector configured to detect the control signal, the light detector being operably coupled to the optical switch such that the optical switch switches the optical network from the first configuration to the second configuration in response to a signal from the light detector.

In some examples, the first optical path comprises a first optical fiber with a first latency and the second optical path comprises a second optical fiber with a second latency higher than the first latency, wherein optionally the first optical fiber comprises a hollow core fiber and the second optical fiber comprises a single mode fiber.

In some examples, the second optical path is longer than the first optical path.

According to a second aspect of the present disclosure, there is provided a method of configuring an optical network comprising an optical splitter and an optical switch, the method comprising: splitting, using the optical splitter, an optical signal incident on the optical splitter into at least a control signal and a data signal; transmitting the control signal to the optical switch via a first optical path between the optical splitter and the optical switch; transmitting the data signal to the optical switch via a second optical path between the optical splitter and the optical switch such that the data signal is incident on the optical switch after the control signal is incident on the optical switch; and using the optical switch, selectively switching the optical network between a first configuration and a second configuration in accordance with the control signal.

In some examples, the method further comprises transmitting a duplicate of the data signal from the optical splitter to the optical switch via a third optical path, wherein selectively switching the configuration of the optical network comprises switching the configuration of the optical network from the first configuration to the second configuration in response to the control signal indicating an anomaly in the data signal, wherein: in the first configuration, a data transmission path for transmission of data from the optical splitter to a remote location in the optical network comprises the second optical path; and in the second configuration, the data transmission path comprises the third optical path instead of the second optical path.

In some examples, the optical signal is a first optical signal transmitted by a first transmitter of the optical network, and the method comprises: with the optical network in the first configuration: transmitting a second optical signal, using a second transmitter of the optical network, to a remote location in the optical network, via a further optical path arranged between the second transmitter and the optical switch and an outgoing optical path arranged between the optical switch and the remote location; switching the optical network from the first configuration to the second configuration in response to the control signal indicating that use of the outgoing optical path is requested for transmission of the data signal; and with the optical network in the second configuration: transmitting the data signal to the remote location, via the second optical path and the outgoing optical path.

Examples in accordance with the present disclosure may include any novel aspects described and/or illustrated herein. The disclosure also extends to methods and/or apparatus substantially as herein described and/or as illustrated with reference to the accompanying drawings. Any apparatus feature may also be provided as a corresponding step of a method, and vice versa.

Any feature in one aspect of the disclosure may be applied, in any appropriate combination, to other aspects of the disclosure. Any, some and/or all features in one aspect can be applied to any, some and/or all features in any other aspect, in any appropriate combination. Particular combinations of the various features described and defined in any aspects of the disclosure can be implemented and/or supplied and/or used independently.

As used throughout, the word 'or' can be interpreted in the exclusive and/or inclusive sense, unless otherwise specified.

BRIEF DESCRIPTION OF THE DRAWINGS

Examples are now described with reference to the accompanying diagrammatic drawings, in which.

DETAILED DESCRIPTION

Figure 1:
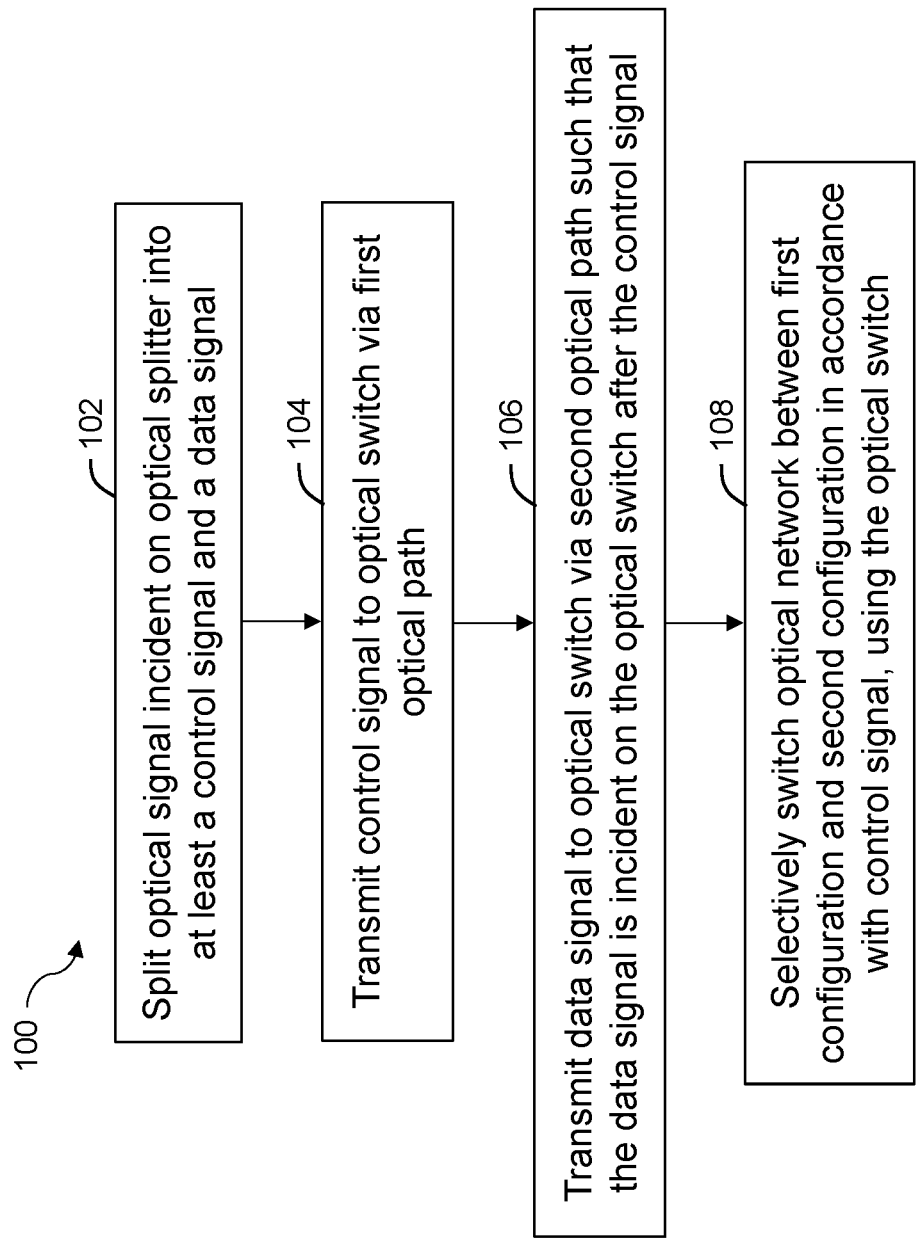
FIG. 1 is a flow diagram illustrating a method in accordance with examples herein.

FIG. 1 illustrates an example method 100 of configuring an optical network. Item 102 of the method 100 involves splitting an optical signal incident on an optical splitter, e.g. a beam splitter or an optical filter, of the optical network into at least a control signal and a data signal. At item 104, the control signal is transmitted to an optical switch of the optical network via a first optical path configured to carry the control signal between the optical splitter and the optical switch. At item 106, the data signal is transmitted to the optical switch via a second optical path configured to carry the data signal between the optical splitter and the optical switch. The optical network is configured such that the data signal is incident on the optical switch after the control signal. For example, the control signal may be transmitted via a lower latency or shorter optical path than the data signal or the data signal may be delayed relative to the control signal, e.g. mechanically or electronically, for example using a transducer for converting an optical signal to an electrical signal or vice versa. At item 108, the optical network is selectively switched from a first configuration to a second configuration in accordance with the control signal, using the optical switch. Use of an optical control signal allows the optical network to be reconfigured more rapidly than with an electrical control signal. Including the control signal in the optical signal that also includes the data signal eliminates the need for a separate control signal, which simplifies reconfiguration of the optical network for transmission of a given data signal. As the control signal is incident on the optical switch before the data signal, the configuration of the optical network can be appropriately controlled for further transmission of the data signal, e.g. to a remote location in the network. Data loss can hence be reduced or eliminated.

Figure 2:
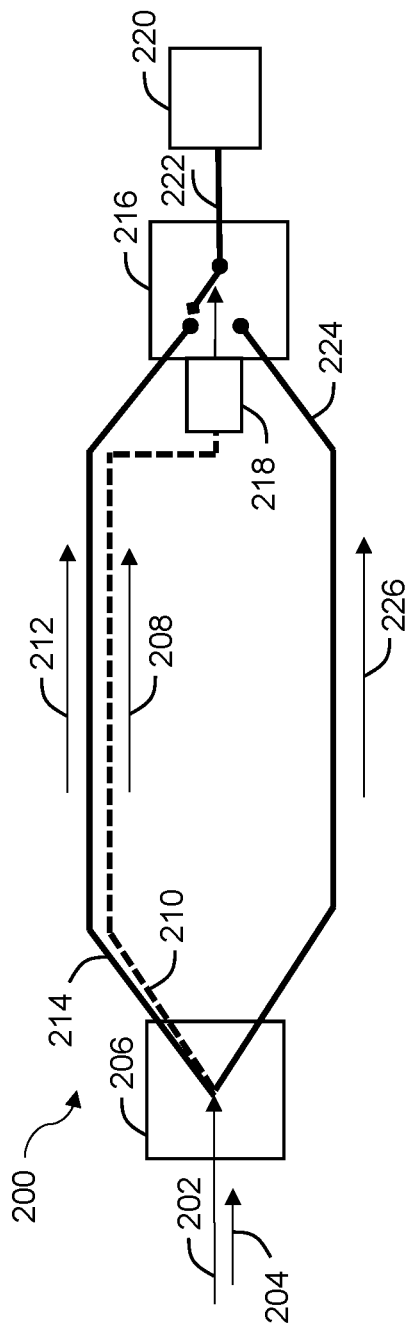
FIG. 2 is a schematic diagram of a portion of an optical network according to first examples.

FIG. 2 is a schematic diagram of an example of a portion of an optical network 200 in which methods similar to or the same as the method 100 of FIG. 1 may be implemented. The optical network 200 is for example a telecommunications network arranged to transmit information using light signals, which may be referred to as optical signals. The optical network 200 includes an incoming optical fiber 202 for transmission of an optical signal 204 to an optical splitter 206. The optical signal 204 is received from another node in the optical network 200 (not shown in FIG. 2). A node is for example an endpoint of the optical network 200 or a redistribution point of an optical network, e.g. to send an optical signal to another node or an endpoint. A node may additionally or alternatively be an element of an optical network, such as an optical amplifier (e.g. an Erbium Doped Fiber Amplifier, EDFA), for adjusting a property of an incident optical signal.

In FIG. 2, the optical splitter 206 on which the optical signal 204 is incident is a beam splitter, e.g. a passive beam splitter, which is configured to divide an incoming light beam (corresponding to an optical signal) into at least two outgoing light beams. In this example, the optical splitter 206 splits an incident optical signal into a control signal 208 for transmission via a first optical path (which in this example is a first optical fiber 210) and a data signal 212 for transmission via a second optical path (which in this example is a second optical fiber 214). Although referred to as a "control signal", this nomenclature is intended merely to indicate that the control signal 208 can be used to control the configuration of the optical network 200. It is to be appreciated that the control signal 208 may be representative of the data signal 212. For example, a small proportion of the optical signal 204 may be split off as the control signal 208, with the remainder of the optical signal 204 corresponding to the data signal 212. In other cases, though, the control signal 208 may differ from the data signal 212, as discussed further with reference to FIG. 4.

The control signal 208 is transmitted to an optical switch 216 of the optical network 200 via the first optical fiber 210, and the data signal 212 is transmitted to the optical switch 216 via the second optical fiber 214. In the example of FIG. 2, the first optical fiber 210 has a first latency, which is lower than a second latency of the second optical fiber 214. The term "latency" is used herein to indicate the delay experienced by an optical signal travelling through an optical fiber or equivalent optical guide per unit length of the optical fiber or equivalent. Latency is often expressed in microseconds per kilometer (µs/km). A lower latency corresponds to a lower refractive index of the transmission medium of the fiber and a higher speed for the transmission of light through the fiber.

In the present case, the first optical fiber 210 includes a hollow core fiber. A hollow core fiber (which may be referred to as a hollow glass fiber) typically include a hollow core (e.g. containing a gas such as air) surrounded by a solid sheath. Light travels through the air in the core of the hollow core fiber rather than through a solid core as with conventional optical fiber. As the light in the hollow core fiber is guided through air, rather than glass, the light can travel faster and signal delay is reduced in comparison to a conventional, solid glass fiber (such as a single mode fiber (SMF), which may be used as the second optical fiber 214). It will be understood that the refractive index of a material corresponds to the inverse of the speed of light through that material and all references here to "refractive index" may be understood in terms of "speed of light". The latency reduction achieved through the use of a hollow core fiber to transmit the control signal 208 can be as much as 1.5 µs/km when compared with a solid glass fiber, e.g. used to transmit the data signal 212. Examples of commercially available hollow core fibers include Nested Antiresonant Nodeless Fiber (NANF), Hollow Core Photonic Bandgap Fiber (HC-PBGF) and Hollow Core Photonic Crystal Fiber (HC-PCF). In other cases, the first optical fiber 210 may instead include a different lower latency optical fiber, such as an SMF-28® ULL optical fiber available from Corning®.

The first optical fiber 210 may therefore be considered to be a fast path, which transmits the control signal 208 more rapidly than the data signal 212 is transmitted by the second optical fiber 214, which may be considered to be a slow path. Due to the difference in transmission speeds of the control and data signals 208, 212, the control signal 208 is incident on the optical switch 216 before the data signal 212. This allows the state of the optical switch 216 to be controlled (based on the control signal 208) before the data signal 212 is incident on the optical switch 216. The configuration of the optical network 200 can in turn be controlled (by controlling the state of the optical switch 216) before the data signal 212 reaches the optical switch 216, e.g. to reduce data loss. In this way, the optical switch 216 can be configured to selectively switch the optical network 200, e.g. from a first configuration to a second configuration, based on the control signal 208.

The optical fibers used in optical networks, such as the optical network 200 of FIG. 2, are vulnerable to various faults. Fibers laid in underground ducts may become inoperable due to accidental damage during roadworks, or due to other works in inter-duct connecting chambers. Fibers carried overhead can be broken by tree falls. Fibers can also be vulnerable to damage caused by wildlife. The data signal 212 may suffer from optical degradation or loss, due to a fault in an optical fiber used to transmit the data signal 212 and/or due to a fault in an optical component for generating or routing the data signal 212. For example, the data signal 212 may be degraded at a node of the optical network 200, such as a transmitter of a networking terminating equipment (NTE) that sent the optical signal 204 including the data signal 212. The data signal 212 may for example suffer from a loss of packets, or may include so-called "bad" data, which is lossy or otherwise incomplete. In these cases, the data signal 212 may be considered anomalous, as it deviates from the expected data signal that would be transmitted in the absence of any data loss.

In FIG. 2, the optical network 200 includes a light detector 218 (sometimes referred to as a photodetector) arranged to detect the control signal 208. In the example of FIG. 2, the optical network 200 includes a bundle of optical fibers including the first and second optical fibers 210, 214. If the bundle of optical fibers is damaged, data transmitted via the first and second optical fibers 210, 214 may each suffer from corresponding loss. In other words, if the data signal 212 is anomalous (e.g. due to a degradation or loss of data), the control signal 208 will also be degraded. In this way, an anomaly in the control signal 208 may indicate a corresponding anomaly in the data signal 212. The light detector 218, which is e.g. a photodiode, can be used to detect the light transmitted using the first optical fiber 210, i.e. the control signal 208, in order to determine whether the data signal 212 is anomalous.

For example, an anomaly in the control signal 208 (and hence in the data signal 212) could be detected by determining that no light has been detected for a predetermined period of time, that any light detected is of an intensity below a predetermined threshold or that no light of an intensity above a predetermined threshold has been detected for a predetermined period of time. Such a light detector can be coupled to the switch 216 so that the state of the switch 216 is automatically changed when the light detector 218 detects an anomaly. A microcontroller coupled to the light detector 218 and the switch 216 could for example be used to effect this control, or the control function could be integrated in a single component with the light detector 218.

In the example of FIG. 2, the optical network 200 is initially in a first configuration in which a data transmission path for transmission of data from the optical splitter 206 to a remote location 220 in the optical network 200 includes the second optical path (which in this case, is the second optical fiber 214). In other words, if the data signal 212 is not anomalous, the second optical fiber 214 is used to transmit the data signal 212 from the optical splitter 206 to the remote location 220. The remote location 220 may be any further point in the optical network 200, such as a further node or an endpoint of the optical network 220, such as a NTE. With the optical network 200 in the first configuration, the switch 216 is in a first state, to connect the second optical fiber 214 to an outgoing optical fiber 222 for transmitting the data signal 212 received from the second optical fiber 214 to the remote location 220.

However, if the control signal 208 indicates an anomaly in the data signal 212, the optical switch 216 is switched to a second state in which the data transmission path includes a third optical path (which in this case is a third optical fiber 224) from the optical splitter 206 to the optical switch 216. With the optical switch 216 in the second state, the optical network 200 is in a second configuration. In the second configuration of the optical network 200, the optical switch 216 connects the third optical fiber 224 to the outgoing optical fiber 222 instead of the second optical fiber 212. In this way, the third optical fiber 224 is used instead of the second optical fiber 214 to transmit data from the optical splitter 206 to the remote location 220, via the optical switch 216.

The third optical fiber 224 is configured to carry a duplicate 226 of the data signal 212 from the optical splitter 206 to the optical switch 216. In this case, the duplicate 226 of the data signal 212 is obtained by splitting the optical signal 204 using the optical splitter 206. The optical splitter 206 is a 1×3 optical splitter in this example, with one input fiber (the incoming optical fiber 202) and three output fibers (the first, second and third optical fibers 210, 214, 224), however this is merely an example. The third optical fiber 224 may be considered to correspond to a protection path, as it protects the optical network 200 from data loss by carrying the duplicate 226 of the data signal 212, which can be used instead of the data signal 212 if the data signal 212 is degraded. For example, the duplicate 226 of the data signal 212 may be generated prior to degradation or other loss of the data signal 212, to reduce data loss. The third optical fiber 224 may be located in a different bundle of optical fibers than the second optical fiber 214, and in some cases may occupy a geographically different route between the optical splitter 206 and the optical switch 216 than the second optical fiber 214, to reduce the risk of the third optical fiber 224 being damaged at the same time as the second optical fiber 214. This arrangement further protects the duplicate 226 of the data signal 212 from undergoing the same degradation as the data signal 212.

As the first optical fiber 210 has a lower latency than the second optical fiber 214, the state of the optical switch 216 (and hence the configuration of the optical network 200) can be controlled appropriately before the data signal 212 is incident on the optical switch 216. In the example of FIG. 2, the third optical fiber 224 has a higher latency than the first optical fiber 210. For example, the third optical fiber 224 may be a SMF, whereas the first optical fiber 210 may be a hollow core optical fiber. In this case, the state of the optical switch 216 can also be changed (if the data signal 212 is anomalous) before the duplicate 226 of the data signal 212 is incident on the optical switch 216. This can further reduce data loss.

The amount of data lost in some examples herein depends on a switching time for switching the optical switch 216 from a first state associated with the first configuration to a second state associated with the second configuration. Using an optical switch 216 such as that of FIG. 2, the switching time may be around 100 nanoseconds (ns) or less. This is notably quicker than switches at a protocol layer of an optical network, which typically have a switching time of around 50 milliseconds (ms). Approaches herein hence reduce data loss compared to existing approaches.

If the switching time is less than a time difference between incidence of the control signal 208 on the optical switch 216 and incidence of the data signal 212 and/or the duplicate 226 of the data signal 212 on the optical switch 216, the state of the optical switch 216 can be changed before the data signal 212 and/or the duplicate 226 of the data signal 212 are transmitted to the remote location 220 without or substantially without loss of data (e.g. a loss of data that is relatively insignificant, such a loss of 10%, 5%, 2%, 1% or less). This may be referred to as "hitless" switching.

In the optical network 200 of FIG. 2, the third optical fiber 224 is configured so that the switching time for switching the optical switch 216 is less than a time difference between incidence of the control signal 208 on the optical switch 216 and incidence of the duplicate 226 of the data signal 212 on the optical switch 216. This means that the state of the optical switch 216 can be changed to the second state (i.e. to transmit the duplicate 226 rather than the data signal 212) before the duplicate 226 reaches the optical switch 216. This allows the duplicate 226 to be transmitted onwards to the remote location 220 without loss of data. In FIG. 2, this is due to the higher latency of the third optical fiber 224 compared to the first optical fiber 210 (for transmitting the control signal 208). However, other arrangements are possible, e.g. as shown in FIG. 3.

Figure 3:
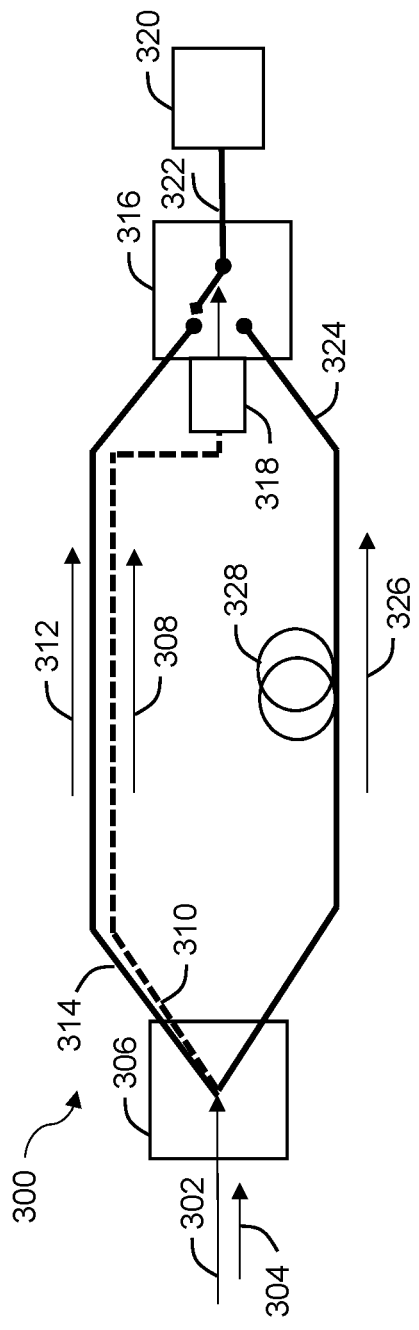
FIG. 3 is a schematic diagram of a portion of an optical network according to second examples.

FIG. 3 shows schematically an example of a portion of an optical network 300 according to further examples. The optical network 300 of FIG. 3 is the same as the optical network 200 of FIG. 2, except for the third optical path 324. Features of FIG. 3 that are the same as corresponding features of FIG. 2 are labelled with the same reference numerals incremented by 100; corresponding descriptions are to be taken to apply.

The optical network 300 of FIG. 3 includes an incoming optical fiber 302 for transmitting an optical signal 304 to an optical splitter 306. The optical splitter 306 splits the optical signal 304 into a control signal 308, a data signal 312 and a duplicate 326 of the data signal 312. The control signal 308 is transmitted to an optical switch 316 by a first optical fiber 310, the data signal 312 is transmitted to the optical switch 316 by a second optical fiber 314 and the duplicate 326 of the data signal is transmitted to the optical switch 316 by a third optical fiber 324. The control signal 308 is detected by a photodetector 318 and the state of the optical switch 316 is controlled based on the control signal 308. An output of the optical switch 316 (either the data signal 312, if the optical switch 316 is in a first state, or the duplicate 326 of the data signal 312, if the optical switch 316 is in a second state), is transmitted to a remote location 320 in the optical network 300 via an outgoing optical fiber 322. The optical switch 316 is switched from the first state to the second state if the control signal 308 indicates that the data signal 312 is anomalous, e.g. if the data signal 312 has suffered from a loss.

In FIG. 3, the optical network 300 is configured to transmit the data signal 312 and the duplicate 326 of the data signal 312 so that the duplicate 326 is incident on the optical switch 316 after the data signal 312 is incident on the optical switch 316. In other words, the duplicate 326 of the data signal 312 is delayed relative to the data signal 312. This further reduces the risk of data being lost due to the switching speed for switching the optical switch 316. Delaying the duplicate 326 may lead to both the duplicate 326 and the data signal 312 being present for a short period of time at a higher layer, e.g. the Ethernet layer. However, duplicate packets can be discarded by a higher layer.

As an example, if the first optical fiber 310 is 10 kilometers (km) long, the control signal 308 will be received around 15 microseconds (µs) before data is lost. The state of the optical switch 316 can be switched ahead of data loss at the optical layer, rather than at a higher layer (which typically leads to greater data loss). Signals are typically lost if they are incident on the optical switch 316 while the optical switch 316 is undergoing switching (which typically takes around 100 ns). To reduce, or eliminate, data loss due to switching of the optical switch 316, the optical network 300 includes a delay loop 328, which in this case corresponds to a small portion of extra optical fiber to compensate for the switching speed of the optical switch 316. In one example, light travels at 230,000,000 meters per second (m/s) in the third optical fiber 324. If there is a 10 km distance between the optical splitter 306 and the optical switch 316, and the optical switch 316 takes 100 ns to switch from the first state to the second state, the delay loop 328 may include 25 m of additional optical fiber to delay the duplicate 326 of the data signal 312 by 125 ns to ensure that there is an overlap of the duplicate 326 of the data signal 312 and the data signal 312 itself.

It is to be appreciated that, in other examples, the optical network 300 may be configured in a different manner but so that the duplicate 326 is nevertheless incident on the optical switch 316 after the data signal 312. For example, the latency of the third optical fiber 324 may be higher than the latency of the second optical fiber 314.

Figure 4:
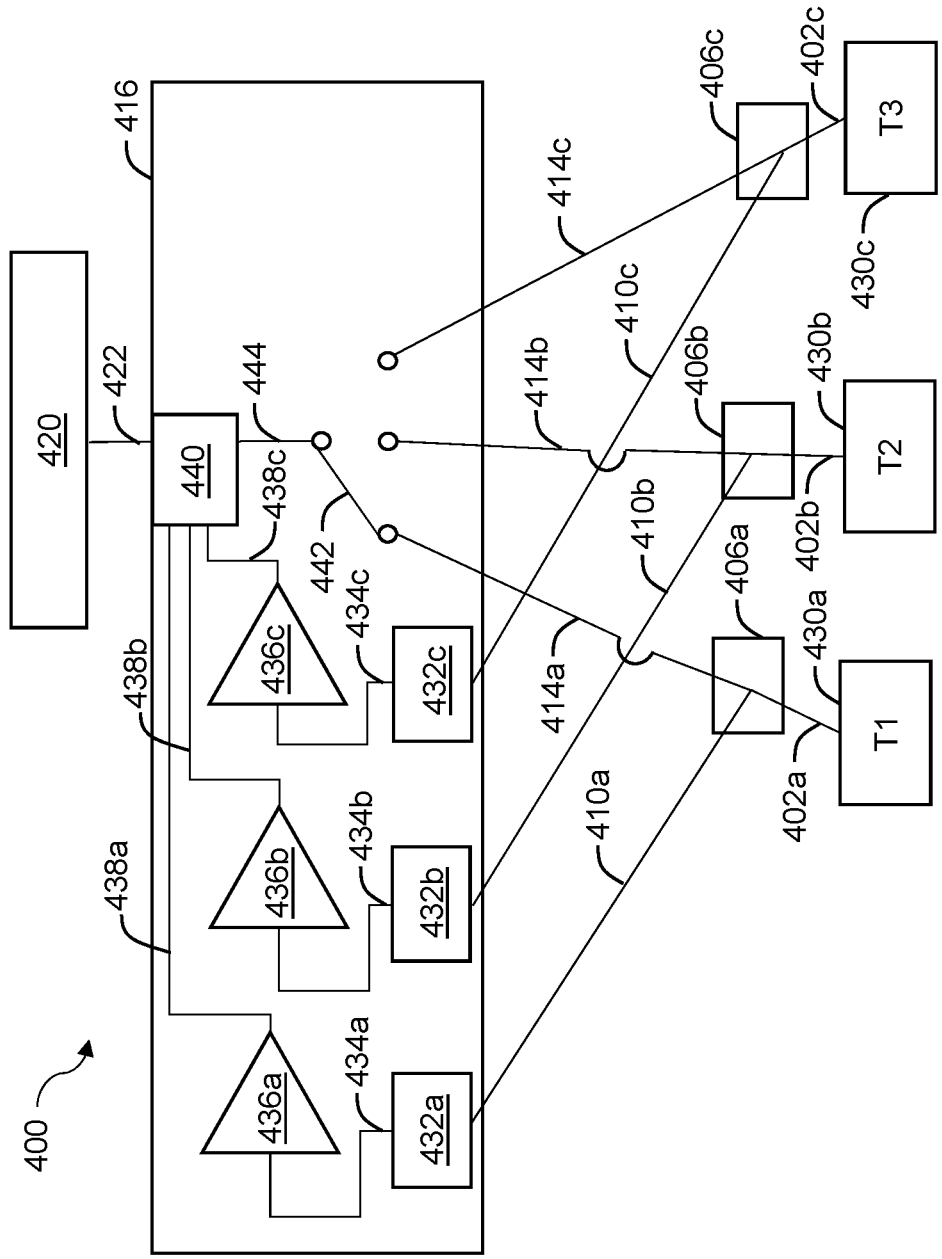
FIG. 4 is a schematic diagram of a portion of an optical network according to third examples.

FIG. 4 shows schematically an example of a portion of an optical network 400 according to yet further examples. Features of FIG. 4 that are the same as corresponding features of FIG. 2 are labelled with the same reference numerals incremented by 200; corresponding descriptions are to be taken to apply.

The optical network 400 of FIG. 4 includes a first transmitter 430a associated with a first user, a second transmitter 430b associated with a second user and a third transmitter 430c associated with a third user. Each of the transmitters 430 is arranged to transmit an optical signal, e.g. by generating the optical signal to encode information to be transmitted. It is to be appreciated that the term "transmitter" used herein is intended to encompass a transmitter that transmits data without being capable of receiving data, as well as a transmitter portion of a transceiver that is capable of both transmitting and receiving data.

Respective optical fibers 402a, 402b, 402c are arranged between each of the transmitters 430 and a corresponding optical splitter 406a, 406b, 406c. The optical fiber 402a between the first transmitter 430a and a first optical splitter 406a is arranged to carry a first optical signal transmitted by the first transmitter 430a. Similarly, the optical fiber 402b between the second transmitter 430b and a second optical splitter 406b is arranged to carry a second optical signal transmitted by the second transmitter 430b, and the optical fiber 402c between the third transmitter 430c and a third optical splitter 406c is arranged to carry a third optical signal transmitted by the third transmitter 430c.

The first transmitter 430a is configured to obtain an input signal including the data signal. For example, the first transmitter 430a may receive the input signal from another component of the optical network 400 or may generate the input signal, e.g. based on input data (which may be in a non-optical format). The first transmitter 430a in this example modifies the input signal to include a control signal for controlling a configuration of the optical network 400, to generate the first optical signal. The input signal may be modulated in various different ways in order to include the control signal. For example, amplitude modulation, frequency modulation and/or pulse code modulation may be applied to the input signal so as to include the control signal in the optical signal. In this way, the optical signal can itself be used to trigger reconfiguration of the optical network 400, as described further below, rather than using separate control signaling. The optical network 400 can hence be reconfigured more rapidly and/or straightforwardly. For example, the control signal may include a low frequency variation of amplitude applied over the top of a data signal coded using high frequency (e.g. 1 gigabit per second (Gbps), 10 Gbps or 100 Gbps) on-off keying (OOK), quadrature phase-shift keying (QPSK) or quadrature amplitude modulation (QAM). In other cases, though, the first transmitter 430a may not modify an input signal in this way. In such cases, a portion of the first optical signal generated by the first transmitter 430a may itself be used as the control signal (and may be the same as the data signal, with the control signal and the data signal each corresponding to a different respective portion of the first optical signal). The second and third transmitters 430b, 430c may be similar to or the same as the first transmitter 430a or may be arranged to generate the second and third optical signals in a different way than the first transmitter 430a and/or than each other.

The first optical splitter 406a splits the first optical signal into a control signal and a data signal. The control signal is transmitted to an optical switch 416 via a first optical path, which in this case corresponds to a first optical fiber 410a, and the data signal is transmitted to the optical switch 416 via a second optical path, which in this case corresponds to a second optical fiber 414a. In FIG. 4, the first optical splitter 406a comprises an optical filter. Use of an optical filter provides for greater flexibility in control of the configuration of the optical network 400. For example, the control signal can be encoded using a different frequency than the data signal. The frequency corresponding to the control signal can then be split from the data signal by the optical filter, which may e.g. be a frequency-selective optical filter. In other cases, though, the first optical splitter 406a may a passive beam splitter, like the beam splitters 206, 306 of FIGS. 2 and 3. The second and third optical splitters 406c, 406c may be similar to or the same as the first optical splitter 406a or different from the first optical splitter 406a and/or each other.

The first optical fiber 410a has a lower latency than the second optical fiber 414a in FIG. 4, so that the control signal (transmitted by the first optical fiber 410a) is incident on the optical switch 416 before the data signal (transmitted by the second optical fiber 414a). In this way, the state of the optical switch 416 (and hence the configuration of the optical network 400) can be controlled before the data signal is incident on the optical switch 416, to reduce data loss (as explained above with reference to FIGS. 2 and 3).

The second and third optical splitters 406b, 406c are arranged to split the second and third optical signals transmitted by the second and third transmitters 430 into respective data and control signals, in a similar manner to the first optical splitter 406a. The control signals obtained from the second and third optical signals are each transmitted to the optical switch 416 by different respective optical fibers 410b, 410c and the data signals obtained from the second and third optical signals are also each transmitted to the optical switch 416 by further different respective optical fibers 414b, 414c.

In FIG. 4, each of the optical fibers 410a, 410b, 410c used to transmit the control signals each have a lower latency than the respective further optical fibers 414a, 414b, 414c for transmitting the data signals, to minimize data loss by appropriate configuration of the optical network 400 before the data signals are incident on the optical switch 416. The optical fibers 410 for transmitting the control signals may hence be referred to as lower latency optical fibers 410 and the optical fibers for transmitting the data signals may be referred to as higher latency optical fibers 414. A lower latency optical fiber is an example of a lower latency optical path and a higher latency optical fiber is an example of a higher latency optical path. It is to be appreciated that, in other examples, an optical fiber may comprise lower and/or higher latency optical path(s) of a different form than the fibers shown in FIG. 4.

In the example of FIG. 4, the control signal(s) transmitted by the lower latency optical fibers 410 are used to control the state of the optical switch 416 to control which of the transmitters 430 is connected to an outgoing optical fiber 422. The outgoing optical fiber 422 is connected to a remote location 420 in the optical network 400. With this arrangement, a user associated with a respective transmitter 430 can request upstream bandwidth (which in this case corresponds to use of the outgoing optical fiber 422 to transmit a data signal) on demand. Use of the outgoing optical fiber 422 can be requested with reduced latency by transmitting a control signal via a respective lower latency optical fiber 410. It is to be appreciated that each transmitter 430 need not transmit a control signal at the same time (although this may happen). Instead, a given transmitter 430 may send a control signal to the optical switch 416 via an optical signal, which is split by the respective optical splitter 406 into a control signal and a data signal, when use of the outgoing optical fiber 422 is desired. In these cases, the outgoing optical fiber 422 is for example a shared optical fiber, which e.g. provides a shared communication channel. A user can take over the entire bandwidth on demand by sending the appropriate control signal, or the optical network 400 can be dynamically reconfigured by the control signal(s) sent by the transmitter(s) 430 to change which data signal is transmitted via the outgoing optical fiber 422. It may be desirable to provide an optical network 400 with such functionality where a given user may, at times, need to send high-priority data to the remote location 420. For example, the optical network 400 may be reconfigured to provide sole use of the outgoing optical fiber 422 for transmission of a data signal where the data signal is provided for an urgent purpose, such as for a disaster recovery effort or the Department of Defense (DoD), or for the transmission of secure data, such as in quantum key distribution (QKD). Examples similar to FIG. 4 may be used to resolve contentious situations in which multiple parties who share the outgoing optical fiber 422 each desire sole use of the outgoing optical fiber 422. For example, a determination of which party is to gain sole use of the outgoing optical fiber 422 may be made based on the control signal(s) submitted by respective parties, which e.g.

may indicate a priority associated with the data signal to be transmitted by the respective parties.

In the example of FIG. 4, rather than using existing approaches for controlling the configuration of an optical network 400, such as processing a signal using a software-defined networking (SDN) controller in the electrical domain, the control signal(s) are processed using the optical switch 416, to reduce latency. Each of the lower latency optical fibers 410a, 410b, 410c is connected to a respective detector 432a, 432b, 432c, to detect a control signal incident thereon (if present). Each detector 432 is for example a photodetector, which converts the control signal (if present) to the electrical domain. In the example of FIG. 4, the converted control signal(s) are then transmitted via respective electrical connections 434a, 434b, 434c to respective amplifiers 436a, 436b, 436c. The amplifiers 436 each amplify a respective converted control signal, and transmit the amplified control signals via further respective electrical connections 438a, 438b, 438c to an actuator 440. However, in other cases, an optical switch otherwise similar to the optical switch 416 of FIG. 4 need not include amplifiers 436, e.g. if the photodetectors 432 are sufficiently sensitive. Based on the control signals (which in the example of FIG. 4 are amplified control signals), the actuator 440 controls the state of a switching element 442 via electrical signals sent via an electrical connection 444 between the actuator 440 and the switching element 442. The switching element 442 has one input (connected to the switching element 442 via the electrical connection 444) and three outputs, each connected to a respective higher latency optical fiber 414a, 414b, 414c. The optical switch 416 in this case includes a low-latency electrical circuit to process control signal(s) received by at least one of the lower latency optical fibers 410 and appropriately configure the state of the optical switch 416 based on the control signal(s) to connect one of the higher latency optical fibers 410 to the outgoing optical fiber 422.

In FIG. 4, the optical switch 416 is in a second state (described further below). The optical switch 416 was switched to the second state from a first state corresponding to a first configuration of the optical network 400. With the optical network 400 in the first configuration, at least a portion of the second optical signal (in this case, the portion corresponding to the data signal) is transmitted to the remote location 420. The portion of the second optical signal is transmitted via an optical path between the second transmitter 430b and the optical switch 416 (which may be referred to as a further optical path and in this case includes the optical fiber 402b and the higher latency optical fiber 414b) and an outgoing optical path between the optical switch 416 and the remote location 420 (which in this case includes the outgoing optical fiber 422). In this example, solely the data signal obtained from the second optical signal is transmitted via the outgoing optical fiber 422 with the optical network 400 in the first configuration, although this need not be the case in other examples. In other words, in the example of FIG. 4, other data signals derived from the optical signals transmitted by other transmitters (in this case, the first and third transmitters 430a, 430c) are not transmitted via the outgoing optical fiber 422 with the optical network 400 in the first configuration.

To switch the state of the optical switch 416 from the first state (not shown in FIG. 4), to the second state (shown in FIG. 4), the first transmitter 430a sends a request to use the outgoing optical fiber 422 for transmission of the data signal obtained from the first optical signal. The request is encoded in a control signal, which is included in the first optical signal. The first optical signal is sent to the first optical splitter 406a by the optical fiber 402a, and the first optical splitter 406a splits the first optical signal into a control signal and a data signal, which are referred to herein as a first control signal and a first data signal, respectively. The first control signal is then sent to the optical switch 416 by the lower latency optical fiber 410a. The optical switch 416 processes the first control signal and actuates the switching element 442 to connect the higher latency optical fiber 414a associated with the first transmitter 430a to the outgoing optical fiber 422 instead of the higher latency optical fiber 414b associated with the second transmitter 430b. FIG. 4 illustrates the configuration of the optical network 400 with the optical switch 416 in the second state, to transmit the first data signal to the remote location 420 via the higher latency optical fiber 414a associated with the first transmitter 430a and the outgoing optical fiber 422. The higher latency optical fiber 414a associated with the first transmitter 430a in this example may be considered analogous to the second optical path described with reference to FIG. 2. Hence, by switching the configuration of the optical network 400 from the first configuration to the second configuration, the outgoing optical fiber 422 is switched from transmitting the data signal associated with the second transmitter 430b (which may be referred to as a second data signal) without transmitting the first data signal (and in this case, solely transmitting the second data signal) to transmitting the first data signal without transmitting the second data signal (and in this case, solely transmitting the first data signal).

The optical switch 416 may subsequently switch the configuration of the optical network 400 back to the first configuration, e.g. upon receipt of a control signal derived from the second optical signal (which may be referred to as a second control signal) requesting use of the outgoing optical fiber 422 for transmission of the second data signal derived from the second optical signal. As explained above, the second control signal may be sent from the second optical splitter 406b to the optical switch 416 via a lower latency optical fiber 410b. The higher latency optical fiber 414b associated with the first transmitter 430b may be considered to correspond to the portion of the further optical path between the second optical splitter 406b and the optical switch 416.

In this example, the optical network 400 is also configurable to a third configuration, in which the outgoing optical fiber 422 is used to transmit the data signal associated with the third transmitter 430c rather than the first and second data signals associated with the first and second transmitters 430a, 430b, respectively. The optical network 400 can be switched to the third configuration by switching the state of the optical switch 416 to a third state in which the higher latency optical fiber 414c associated with the third transmitter 430c is connected to the outgoing optical fiber 422, and the higher latency optical fibers 414a, 414b associated with the first and second transmitters 430a, 430b are disconnected from the outgoing optical fiber 422.

As the control signal(s) are transmitted using the lower latency optical fiber(s) 410, the control signal(s) are received by the optical switch 416 before the data signal(s). In this way, the state of the optical switch 416 can be preconfigured to connect the appropriate higher latency optical fiber 414 to the outgoing optical fiber 422 before the data signal from that particular higher latency optical fiber 414 is incident on the optical switch 416. The data signal can hence be transmitted to the outgoing optical fiber 422 with reduced loss at the optical switch 416.

A control signal used to control the state of the optical switch 416 may be a binary signal. For example, the control signal associated with a given transmitter 430 may take one value (e.g. a 1) to indicate that use of the outgoing optical fiber 422 is requested, and a different value (e.g. a 0) to indicate that use of the outgoing optical fiber 422 is not requested. In other cases, the control signal may be encoded in a non-binary manner, e.g. to encode a priority associated with given data using an amplitude or attenuation of the control signal. For example, a higher priority may be indicated by a higher amplitude control signal. In such cases, the optical switch 416 may be programmed with a suitable comparator to assign use of the outgoing optical fiber 422 for transmission of the data signal associated with the control signal with a higher amplitude or power. In such cases, additional logic may be included in the optical switch 416 to reduce the risk of undesired interference in the optical network 400, e.g. to give one party continuous higher priority.

In an example in which amplitude is used to signal priority, an amplitude comparator circuit could be used to determine which party has priority for use of the outgoing optical fiber 422. In such cases, input control signals received at respective photodetectors 432 (e.g. respective photodiodes) can be converted to respective currents. At least one op-amp comparator can be used to compare a plurality of inputs (e.g. a plurality of input currents derived from respective control signals). Each op-amp comparator takes two inputs (input 1 and input 2), and produces a logical high at the output if input 1 is larger than input 2, or a low in the reverse case. In general, by using AND gates for all combinations which include a particular input, only one AND gate will be larger than all the rest, which can be indicated by generating a digital HIGH value. On this basis, by using a pair of op-amp comparators between each pair of inputs, the largest input (and hence the largest control signal) can be deduced. Alternatively, an analogue to digital converter could be used to process each of the current or voltage signals from the photodiodes (e.g. corresponding to different respective control signals), in which case finding the largest value can be performed straightforwardly using digital processing.

In some cases, the control signal may have sufficient power to directly control the optical switch. In these cases, rather than converting the control signal from the optical domain to the electrical domain (as for the optical switch 416 illustrated in FIG. 4), the optical switch may be configured to be powered by the control signal itself. This eliminates the need to convert the optical signal to the optical domain, which can simplify control of the optical switch, and in some cases can further reduce latency. In these cases, a change in a state of the optical switch, such as a mechanical state and/or a refractive index, may be configured to be powered by the control signal, so that the change in the state of the optical switch switches the optical network 400 from the first to the second configuration.

In these examples, the optical switch may include a switch which operates via at least one of: the piezo-optic effect, the large elasto-optic effect or the inverse large elasto-optic effect. A piezo-optic switch (which is e.g. a switch that operates via the piezo-optic effect) can mechanically deform in the presence of light. The state of the switch can hence be changed directly by deformation of the material of the switch, which in this case includes piezo-optic material such as lithium niobate. Piezo-optic material mechanically changes shape upon receipt of light (e.g. in the form of the control signal), altering the position of a contact. For example, a piezo-optic material may deform so that a connection between a higher latency optical fiber 414*b* associated with the second transmitter 430*b* and a contact of the switch is broken, but so that a connection between the contact and a higher latency optical fiber 414*a* associated with the first transmitter 430*a* is made, to switch the optical network 400 from the first to the second configuration.

In some cases, an optical switch may be fabricated with microstructures which resonate at certain optical frequencies and couple light at that frequency between input and output ports. Material of a given component of the optical switch, e.g. the substrate or film on which the microstructures are arranged, may be responsive to an incoming optical control signal. In this cases, the material may respond to the control signal via a physical effect such as the inverse large elasto-optic effect, in which the material changes its mechanical state in response to being irradiated by light. For example, a physical dimension and/or a refractive index of the material may change in response to the control signal. Changing the physical dimensions of at least one component of the optical switch may cause the microstructures to move or deform relative to the input and/or the output ports. This in turn may change the coupling behavior of the optical switch, e.g. for coupling light received via the higher latency optical fibers 414 to the outgoing optical fiber 422, effectively leading to a change in a state in the optical switch (e.g. to change the optical switch from a first to a second state). For example, changing the physical dimensions of at least one component of the optical switch may change which of the higher latency optical fibers 414 is coupled to the outgoing optical fiber 422. Changing the refractive index of at least one component of the optical switch in response to the control signal(s) may cause the data signal(s) incident on the optical switch (e.g. via the higher latency optical fibers 414) to take a different path between input and output ports of the optical switch (e.g. to selectively couple at least one of the higher latency optical fibers 414 to the outgoing optical fiber 422). In this way, a change in the state of the optical switch can be effected.

In examples such as FIG. 4 in which multiple users may wish to use the same shared optical path (e.g. the outgoing optical fiber 422), two or more users may try to transmit signals via the same optical path at the same time. This can lead to so-called "collision", in which each of the signals creates noise for each other signal, leading to unsuccessful transmission of any of the signals. In such cases, it may be desirable to perform collision detection, to detect that collision is at risk of occurring, e.g. to determine that multiple uses wish to use the shared optical fiber at the same time. Collision avoidance can then be performed to avoid collision occurring.

Figure 5:
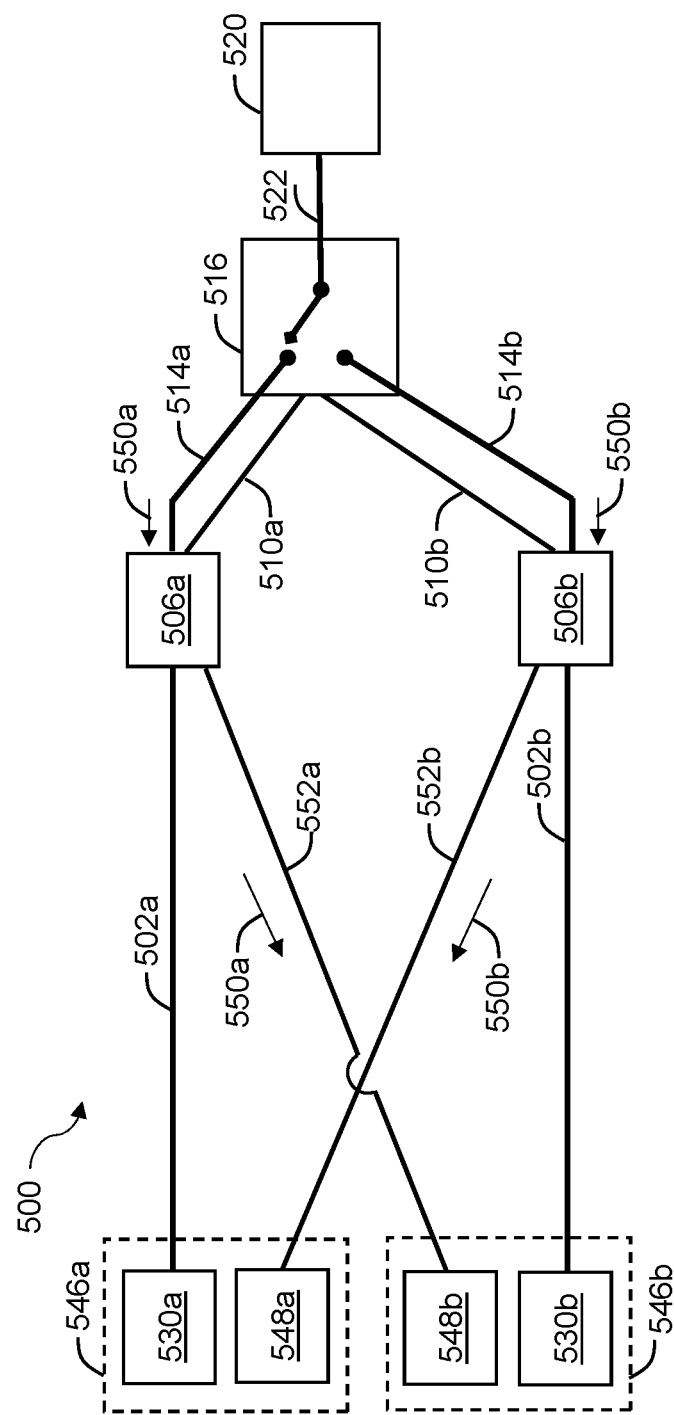
FIG. 5 is a schematic diagram of a portion of an optical network according to fourth examples.

An example which is arranged to perform collision detection is shown schematically in FIG. 5, which illustrates a portion of an optical network 500 according to further examples. Features of FIG. 5 that are the same as corresponding features of FIG. 2 are labelled with the same reference numerals incremented by 300; corresponding descriptions are to be taken to apply.

The optical network 500 includes a first node 546*a* and a second node 546*b*. The first node 546*a* is associated with a first user and includes a first transmitter 530*a* and a first photodetector 548*a*. The second node 546*b* is associated with a second user and includes a second transmitter 530*b* and a second photodetector 548*b*. The first and second photodetectors 548*a*, 548*b* are hence associated with the first and second transmitters 530*a*, 530*b*, respectively. The first and second transmitters 530*a*, 530*b* are arranged to transmit first and second optical signals, which are divided into control and data signals by first and second optical splitters 506a, 506b, respectively. The control signals are transmitted to an optical switch 516 via first and second lower latency optical fibers 510a, 510b. The data signals are also transmitted to the optical switch 516 via first and second higher latency optical fibers 514a, 514b, so that the data signals are incident on the optical switch 516 after the control signals are incident on the optical switch 516. It is to be appreciated that the first and second transmitters 530a, 530b need not transmit the optical signals (and hence the control and data signals) at the same time at each other. In such cases, at a given time, the optical network 500 may include solely signals from one of the transmitters 530. A state of the optical switch 516 depends on the control signal(s) received. In this way, the first and second users can use the control signals to request use of an outgoing optical fiber 522 for transmitting data signals to a remote location 520 in the optical network 500.

The optical network 500 is configurable to a first configuration (not shown in FIG. 5), in which the second user has use of the outgoing optical fiber 522 for transmitting a data signal derived from the second optical signal (which may be referred to as a second data signal). The optical network 500 is also configurable to a second configuration (shown in FIG. 5), in which the first user has use of the outgoing optical fiber 522 for transmitting a data signal derived from the first optical signal (which may be referred to as a first data signal).

In the first configuration, the optical network 500 is configured to transmit a backscattered portion 550b of the second data signal, backscattered at a second input port associated with the optical switch 516, to the first node 546a. Backscattering for example refers to at least partial reflection of an incident signal back in the direction it came from, which may be referred to as back-reflection. Backscattering may include diffuse reflection (e.g. due to scattering) and/or specular reflection. The backscattering may occur due to inherent properties of the optical switch 516 or the optical switch 516 may be configured to enhance backscattering, to facilitate detection of the backscattered signal.

The backscattered portion 550b of the second data signal is transmitted from the optical switch 516 to the second optical splitter 506b via the second higher latency optical fiber 514b in FIG. 5. In other cases, though, the backscattered portion 550b of the second data signal is transmitted from the optical switch 516b to the second optical splitter 506b via a different optical path, e.g. via a different optical fiber, than that used to transmit the second data signal itself. The second optical splitter 506b is configured to direct the backscattered portion 550b of the second data signal to the first photodetector 548a, via a further optical path (in this case a further optical fiber 552b) between the second optical splitter 506b and the first photodetector 548a. The first photodetector 548a detects the backscattered portion 550b of the second data signal and generates a signal (e.g. an electrical signal) indicative of the backscattered portion 550b of the second data signal. When the optical network 500 is in the first configuration, the signal is indicative that the second data signal is being carried by the outgoing optical fiber 522. It can therefore be determined at the first node 546a, based on the signal generated by the first photodetector 548a, whether another node (in this case, the second node 546b) is attempting to use the outgoing optical fiber 522. For example, if the intensity of the backscattered portion 550b of the second data signal decreases, e.g. so that it meets or is less than a threshold intensity, it can be determined that the second user is no longer using the outgoing optical fiber 522. In some cases, the first photodetector 548a may be wavelength selective (for example by placing an optical filter in the path between the further optical fiber 552b and the first photodetector 548a), and may be used to detect the intensity of the backscattered portion 550b of the second data signal at a particular wavelength or within a particular wavelength band. In this way, the first photodetector 548a can be used to determine whether a particular wavelength channel is in use, rather than whether the outgoing optical fiber 522 as a whole is in use.

In a similar manner, when the optical network 500 is in the second configuration (illustrated in FIG. 5), the first user has use of the outgoing optical fiber 522 for transmitting a data signal derived from the first optical signal (which may be referred to as a first data signal). In this case, the optical network 500 is configured to transmit a backscattered portion 550a of the first data signal, backscattered at a first input port associated with the optical switch 516, to the second node 546b. The backscattered portion 550a of the first data signal is transmitted from the optical switch 516 to the first optical splitter 506a via the first higher latency optical fiber 514a in FIG. 5. In other cases, though, the backscattered portion 550a of the first data signal is transmitted from the optical switch 516b to the first optical splitter 506a via a different optical path, e.g. via a different optical fiber, than that used to transmit the first data signal itself. The first optical splitter 506a is configured to direct the backscattered portion 550a of the first data signal to the second photodetector 548b by a further optical path (in this case a further optical fiber 552a) between the first optical splitter 506a and the second photodetector 548b. The second photodetector 548b (which in this case is associated with a second node 546b, e.g. with a second piece of communication equipment, and a second sender) detects the backscattered portion 550a of the first data signal, and generates a signal, based on the backscattered portion 550a of the first data signal. In FIG. 5, with the optical network 500 in the second configuration, the signal generated by the second photodetector 548b is indicative that the first data signal is being carried by the outgoing optical fiber 522. In this way, it can be detected that another node (the first node 546a in this case) is attempting to use the outgoing optical fiber 522.

In response to determining that another node (e.g. associated with another user) is attempting to use the outgoing optical fiber 522, the second sender (associated with the second node 546b) for example waits until the backscattered portion 550a of the first data signal reduces in intensity, indicating that the first sender (associated with the first node 546a) has finished transmitting, and the shared optical fiber 522 is available for re-transmission. A suitable collision avoidance algorithm may be performed, such as the carrier-sense multiple access with collision avoidance (CSMA/CA) algorithm, where the collision detection part of the algorithm uses the detection of the backscattered light. Backoff may then be performed by the user that is unsuccessful in their first request to use the shared optical fiber 522. Backoff for example refers to an amount of time (which is typically a random amount of time but need not be) that the user must wait after a failed transmission before re-attempting to send the transmission. The user (e.g. the node associated with the user) can for example determine that a transmission has failed by lack of receipt of a handshake response or other downstream signal in response to the transmission.

It is to be appreciated that various different methods may be used to manage contention for the shared optical fiber 522 by multiple users requesting it at the same time. In some implementations, a controller of the optical switch 516 may queue requests, and may limit the time taken by any one user, before other users in the queue are connected by the controller changing the configuration of the optical switch 516. If there are no other users, the first user (in this case associated with the first node 546a) may simply submit multiple requests to the queue, and the controller may receive no more than one request in a given interval for any user to prevent unfair denial of service behavior. The controller may also choose to implement the queue in a 'first in last out' i.e. stack mode, which further ensures that a number of previous requests for service sent using the control signal from one user cannot block access to new requests by other users. Therefore, the first user can have seamless access to the shared optical fiber 522 in the absence of other active users, by filling the queue with requests (up to one of which will be accepted per time interval), but cannot flood the queue.

Figure 6:
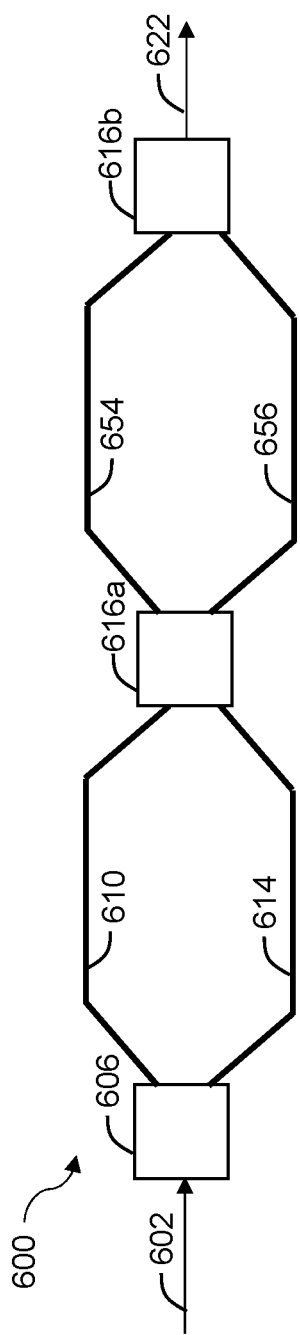
FIG. 6 is a schematic diagram of a portion of an optical network according to fifth examples.

The example of FIG. 4 illustrates a single optical switch 416 between the optical splitters 406 and the remote location 420. However, this need not be the case in other examples. FIG. 6 shows schematically a portion of an optical network 600 according to further examples in which there are a plurality of optical switches. Features of FIG. 6 that are the same as corresponding features of FIG. 2 are labelled with the same reference numerals incremented by 400; corresponding descriptions are to be taken to apply.

In the optical network 600 of FIG. 6, an optical signal is transmitted to an optical splitter 606 via an optical fiber 602. The optical splitter 606 splits the optical signal into a control signal, which is transmitted to a first optical switch 616a via a first optical fiber 610, and a data signal, which is transmitted to the first optical switch 616a via a second optical fiber 614. The first optical fiber 610 has a lower latency than the second optical fiber 614 so the control signal is incident on the first optical switch 616a before the data signal (as described above with reference to FIG. 2).

In this example, the optical network 600 also includes a second optical switch 616b. The optical network 600 may also include at least one further optical switch (not shown in FIG. 6). Multiple optical switches can provide multiple possible routes for transmitting a data signal to a remote location, e.g. via a shared optical fiber 622. In this example, a state of the first optical switch 616a is configured by the control signal to connect the second optical fiber 614 to an appropriate path for transmission of the data signal to the remote location. The first optical switch 616a is also configured to route the control signal via a suitable path (e.g. a lower latency path than the path for transmission of the data signal) to a subsequent optical switch (in this case, the second optical switch 616b).

In this case, the first optical switch 616a is configured to route the control signal to a first outgoing optical path 654 between the first and second optical switches 616a, 616b, and to route the data signal to a second outgoing optical path 656 between the first and second optical switches 616a, 616b. The first and second optical paths 654, 656 are such that the data signal is incident on the second optical switch 616b after the control signal is incident on the second optical switch 616b. For example, the first optical path 654 may be a lower latency and/or shorter optical path than the second optical path 656.

It is to be appreciated that FIG. 6 is a simplified example. The principles shown in FIG. 6 may be applied to any of the other examples here. For example, the approach of FIG. 6 may be used in examples otherwise similar to that of FIGS. 2 and 3, in which the optical network also includes a protection path (e.g. including a third optical fiber) for transmission of a duplicate of a data signal. Alternatively or additionally, the approach of FIG. 6 may be used in examples otherwise similar to that of FIGS. 4 and 5. In such cases, any of the optical switches may receive inputs associated with a plurality of transmitters, respectively.

Figure 7:
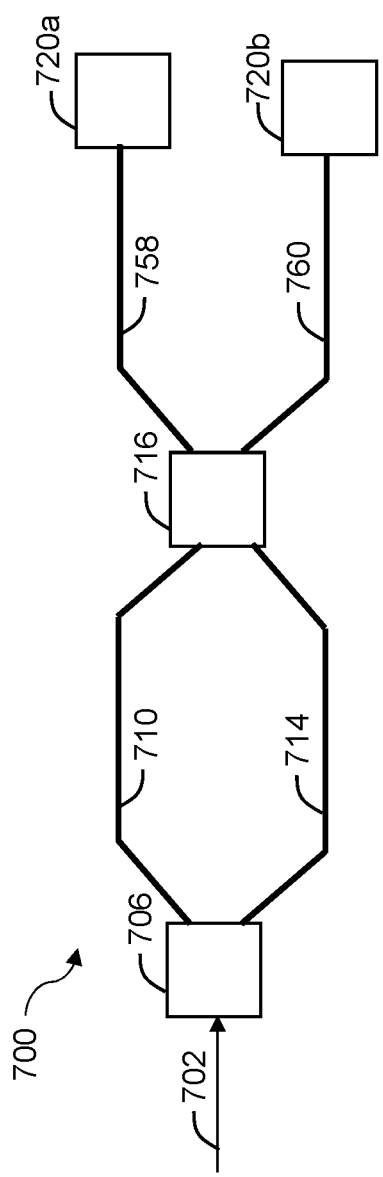
FIG. 7 is a schematic diagram of a portion of an optical network according to sixth examples.

In the example of FIG. 4, a single contended optical fiber (the outgoing optical fiber 422) is shared between multiple input optical fibers (the higher latency optical fibers 414). In this example, the optical switch 416 is a many-to-one optical switch. However, it is to be appreciated that the concepts described herein are applicable to other optical networks in which a many-to-many optical switch is provided. FIG. 7 shows schematically a portion of an optical network 700 according to further examples that include a many-to-many optical switch 716. Features of FIG. 7 that are the same as corresponding features of FIG. 2 are labelled with the same reference numerals incremented by 500; corresponding descriptions are to be taken to apply.

In the optical network 700 of FIG. 7, an optical signal is transmitted to an optical splitter 706 via an optical fiber 702. The optical splitter 706 splits the optical signal into a control signal, which is transmitted to an optical switch 716 via a first optical fiber 710, and a data signal, which is transmitted to the optical switch 716 via a second optical fiber 714. The first optical fiber 710 has a lower latency than the second optical fiber 714 so the control signal is incident on the optical switch 716 before the data signal (as described above with reference to FIG. 2).

In the example of FIG. 7, the optical switch 716 has two outputs: a first outgoing optical path 758 between the optical switch 716 and a first remote location 720a and a further outgoing optical path 760 between the optical switch 716 and a further remote location 720b. In the first configuration, the optical network 700 is configured to transmit the data signal from the optical switch 716 to the first remote location 720a via the first outgoing optical path 758. In the second configuration, the optical network 700 is configured to transmit the data signal from the optical switch 716 to the further remote location 720b via the further outgoing optical path 760.

The outgoing optical path to be used to transmit the data signal may be signaled to the optical switch 716 using the control signal, e.g. by modulating the control signal appropriately. For example, the configuration to which the optical network 700 is to be switched may be indicated by at least one of a frequency of the control signal, an amplitude of the control signal, or a pulse code modulation associated with the control signal. For example, a different frequency of control signal may be used to select a different outgoing optical path for transmission of the data signal. In these examples, the optical switch 716 may include a set of filters to route the control signal towards the appropriate switching element (which may e.g. be a piezo-optic switch), which may then be activated by the optical power of the control signal.

Similarly to FIG. 6, FIG. 7 is a simplified example. The principles shown in FIG. 7 may be applied to any of the other examples here, such as those of any of FIGS. 2 to 6.

Alternatives and Modifications

In the examples of FIGS. 2 and 3, the optical networks 200, 300 include a lower latency optical path for transmission of a control signal than for transmission of a data signal, so that the control signal is incident on an optical switch before the data signal. In other examples, an optical network which is otherwise similar to or the same as the optical networks described herein may be arranged differently but such that the control signal is nevertheless incident on the optical switch before the data signal. For example, the second optical path (for transmission of the data signal) may be longer than the first optical path (for transmission of the control signal). Alternatively or additionally, the second optical path may include a delay loop, so as to delay the data signal relative to the control signal. These approaches also allow the optical switch to be controlled using the control signal in the optical domain, which reduces latency compared to approaches that use electrical signals to control a configuration of an optical network. In some cases, though, the data signal may be delayed relative to the control signal using a transducer arranged to convert optical signals to electrical signals or vice versa. In these examples, a delay may be introduced by the transducer, mechanically or electronically.

In FIGS. 2 and 3, the first and second optical fibers 210, 310, 214, 314 are located in the same bundle of optical fibers. However, this need not be the case in other examples. For example, an optical network that is otherwise similar to the optical networks 200, 300 of FIGS. 2 and 3 may include an additional incoming optical path prior to the optical splitter 206, 306. The additional incoming optical path for example traverses a different geographical route to the optical splitter 206, 306 than the incoming optical fiber 202, 302 and/or is in a different bundle than the incoming optical fiber 202, 302. In this way, the additional incoming optical path can act as an extension to the protection path between the optical splitter 206, 306 and the optical switch 216, 316, for transmitting a duplicate of the optical signal 204, 304 (or a duplicate of the data signal derived from the optical signal 204, 304) to the optical splitter 206, 306. The duplicate of the optical signal 204, 304 can then be further transmitted from the optical splitter 206, 306 to the optical switch 216, 316 via the third optical path 224, 324. Hence, in these examples, the protection path includes both the additional incoming optical path and the third optical path 224, 324.

If the incoming optical fiber 202, 302 for transmitting the optical signal 204, 304 to the optical splitter 206, 306 suffers from a fault, the optical signal 204, 304 may in turn suffer from a loss. The control and data signals 208, 308, 212, 312 derived from the optical signal 204, 304 (and transmitted to the optical switch 216, 316 via the first and second optical paths 210, 310, 214, 314) may hence also suffer from a loss. This loss is detectable by the light detector 218, 318 by measuring the control signal 208, 308. If such a loss is detected, the configuration of the optical network 200, 300 can be switched to transmit the duplicate of the optical signal 204, 304 via the protection path, instead of transmitting the data signal via the second optical path 214, 314.

The optical switch 416 of FIG. 4 is provided merely as an illustrative example. It is to be appreciated that other optical switches, e.g. with different internal components, may be used in other optical networks in accordance with examples herein, e.g. to achieve the same effects as the optical switch 416 of FIG. 4. Furthermore, whereas the switching element 442 of FIG. 4 is arranged to receive three inputs (from the three higher latency optical fibers 414), this is not intended to be limiting. In other cases, approaches similar to those described herein may be used with optical switches arranged to receive any number of inputs, e.g. optical switches with a higher number of inputs, such as 1024 inputs.

In FIG. 5, backscattered portions 550a, 550b of the first and second data signals are detected by the second and first photodetectors 548b, 548a respectively, to determine whether a shared optical fiber 522 is being used. As the data signals are typically higher power than the control signals, the backscattered portions 550a, 550b of the first and second data signals are, in turn, easier to detect than a backscattered portion of a control signal. However, in some cases (e.g. if a control signal is of sufficiently high power), a backscattered portion of a control signal may instead or in addition be detected, and used to determine whether a shared optical fiber is in use. In these examples, which are otherwise similar to FIG. 5, a backscattered portion of the control signal derived from the first optical signal and/or the control signal derived from the second optical signal are directed towards the second and first photodetectors 548b, 548a respectively, alone or in addition to the backscattered portions 550a, 550b of the first and second data signals. In these examples, the backscattered portion of the control signal derived from the first optical signal may be transmitted to the second photodetector 548b via the first lower latency optical fiber 510a, the first optical splitter 506a and the further (or another further) optical fiber 552a between the first optical splitter 506a and the second photodetector 548b. The backscattered portion of the control signal derived from the second optical signal may be transmitted to the first photodetector 548a via the second lower latency optical fiber 510b, the second optical splitter 506b and the further (or another further) optical fiber 552b between the second optical splitter 506b and the first photodetector 548a. Use of a backscattered portion of a control signal allows use of the shared fiber to be more rapidly detected in some examples, e.g. if the backscattered portion of the control signal is transmitted back to a photodetector via a lower latency optical path than that for transmission of a backscattered portion of a data signal.

In FIG. 5, backscattered light is used to determine whether an outgoing optical fiber 522 is in use. However, determination of whether the outgoing optical fiber 522 is available or is in use by another party may be performed in a different manner in other examples. For example, a sender may determine that the outgoing optical fiber 522 is available for use by detecting the absence of downstream light.

It is to be appreciated that FIGS. 2 to 6 illustrate unidirectional transmission of optical signals via example optical networks 200-600. However, it is to be appreciated that, in practice, optical networks otherwise similar to or the same as the optical networks 200-600 of FIGS. 2 to 6 may include a duplicate arrangement for transmitting optical signals in the opposite direction.

In examples described above, optical fibers are given as examples of optical paths. It is to be appreciated herein that the approaches described herein may equally be applied to other examples that use optical paths other than optical fibers, e.g. optical free space paths.

In some examples, all or part of an optical path may be provisioned as a core of a multicore fiber. In these cases, an optical switch arranged to change an optical network between a first and second configuration as described in examples herein may be arranged to change the coupling between respective cores in different, e.g. separate, sections of a multicore fiber. For example, the optical switch may be arranged between a first and second section of a multicore fiber. With the optical switch in a first state, the optical switch may couple a first core of the first section of the multicore fiber to a first core of the second section of the multicore fiber. In a second state, the optical switch may instead couple the first core of the first section of the multicore fiber to a second core of the second section of the multicore fiber. In these examples, switching the optical switch between states may involve rotating the first section of the multicore fiber relative to the second core of the multicore fiber, so as to change which core of the first section is optically coupled to a given core of the second section. The ends of the first and second sections may be arranged within a low friction jacket and a suitable motor (such as a calibrated stepper motor) may grip one or both of the first and second sections to rotate the first and/or second sections relative to each other. The ends of the first and second sections may abut each other, so that respective ends of the cores of each of the first and second sections also face each other. Optical gel may be arranged between the ends of the first and second sections to reduce friction during rotation of the first and/or second sections, and to efficiently transmit the optical signals from the first to the second section. This type of optical switch may be used in any examples herein, and e.g. allows a one to many or a many to many optical switch to be provided in a simple manner, for example without a complex optical system.

A rotating optical switch of this type may be used in optical networks otherwise similar to the optical network 700 of FIG. 7. In these examples, the second optical path (which in FIG. 7 corresponds to the second optical fiber 714) comprises a first core of a first section of a multicore optical fiber, the first outgoing optical path 758 comprises a first core of a second section of the multicore optical fiber, the further outgoing optical path 760 comprises a second core of the second section of the multicore optical fiber, and the optical switch 716 is operable to rotate the first section of the multicore optical fiber relative to the second section of the multicore optical fiber, e.g. by rotating either the first or second sections or both the first and second sections of the multicore optical fiber. With this arrangement, the first core of the first section of the multicore optical fiber is optically coupled to the first core of the second section of the multicore optical fiber with the optical switch 716 in the first configuration. However, when the optical switch 716 is switched to the second configuration, the first core of the first section of the multicore optical fiber is optically coupled to the second core of the second section of the multicore optical fiber instead of the first core of the second section.

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. An optical network comprising:
an optical splitter configured to split an optical signal incident on the optical splitter into at least a control signal and a data signal;
an optical switch;
a first optical path configured to carry the control signal between the optical splitter and the optical switch;
a second optical path, separate from the first optical path, configured to carry the data signal between the optical splitter and the optical switch; and
a third optical path, separate from the first optical path and the second optical path, configured to carry a duplicate of the data signal between the optical splitter and the optical switch,
wherein:
the optical network is configured to transmit the control signal and the data signal such that the data signal is incident on the optical switch after the control signal by at least one of:
the first optical path having a lower latency than the second optical path,
the second optical path being longer than the first optical path, or
the second optical path including a delay loop; and
the optical switch is configured to selectively switch the optical network between a first configuration and a second configuration in accordance with the control signal, wherein:
in the first configuration, a data transmission path for transmission of data from the optical splitter to a remote location in the optical network comprises the second optical path; and
in the second configuration, the data transmission path comprises the third optical path instead of the second optical path.

2. The optical network of claim 1, wherein the optical switch is configured to switch the optical network from the first configuration to the second configuration in response to the control signal indicating an anomaly in the data signal.

3. The optical network of claim 1, wherein the optical network is configured to transmit the data signal and the duplicate of the data signal such that the duplicate of the data signal is incident on the optical switch after the data signal is incident on the optical switch.

4. The optical network of claim 1, wherein the optical network is configured such that a switching time for switching the optical switch from a first state associated with the first configuration to a second state associated with the second configuration is less than a time difference between incidence of the control signal on the optical switch and incidence of the duplicate of the data signal on the optical switch.

5. The optical network of claim 1, wherein the optical network comprises a bundle of optical fibers comprising a first optical fiber corresponding to the first optical path and a second optical fiber corresponding to the second optical path.

6. The optical network of claim 1, wherein the optical network is configured such that a switching time for switching the optical switch from the first configuration to the second configuration is less than a time difference between incidence of the control signal on the optical switch and incidence of the data signal on the optical switch.

7. The optical network of claim 1, wherein the optical signal is a first optical signal and the optical network further comprises:
a first transmitter configured to transmit the first optical signal, the optical splitter being arranged between the first transmitter and the optical switch;
a second transmitter configured to transmit a second optical signal;
a further optical path between the second transmitter and the optical switch; and
an outgoing optical path between the optical switch and the remote location,
wherein:
in the first configuration, the optical network is configured to transmit at least a portion of the second optical signal to the remote location, via the further optical path and the outgoing optical path; and
in the second configuration, the optical network is configured to transmit the data signal to the remote location, via the second optical path and the outgoing optical path.

8. The optical network of claim 7, wherein the optical switch is configured to switch the optical network from the first configuration to the second configuration in response to the control signal indicating that use of the outgoing optical path is requested for transmission of the data signal.

9. The optical network of claim 7, wherein the optical splitter is a first optical splitter, the data signal is a first data signal, the further optical path is a lower latency optical path, and the optical network further comprises:
   a second optical splitter between the second transmitter and the optical switch, the second optical splitter configured to split the second optical signal into at least a second control signal and a second data signal; and
   a higher latency optical path having a higher latency than the lower latency optical path and being configured to carry the second control signal between the second optical splitter and the optical switch,
   wherein the lower latency optical path is configured to carry the second data signal between the second optical splitter and the optical switch.

10. The optical network according to claim 9, further comprising at least one of:
    a first photodetector associated with the first transmitter, the first photodetector configured to, with the optical network in the first configuration:
       detect a backscattered portion of the second data signal, backscattered at a second input port associated with the optical switch; and
       generate a signal, based on the backscattered portion of the second data signal, indicative that the second data signal is being carried by the outgoing optical path; or
    a second photodetector associated with the second transmitter, the second photodetector configured to, with the optical network in the second configuration:
       detect a backscattered portion of the first data signal, backscattered at a first input port associated with the optical switch, with the optical network in the second configuration; and
       generate a signal, based on the backscattered portion of the first data signal, indicative that the first data signal is being carried by the outgoing optical path.

11. An optical network comprising:
    a first transmitter configured to transmit a first optical signal;
    an optical switch;
    an optical splitter arranged between the first transmitter and the optical switch, the optical splitter being configured to split a first optical signal incident on the optical splitter into at least a control signal and a data signal;
    a second transmitter configured to transmit a second optical signal;
    a first optical path configured to carry the control signal between the optical splitter and the optical switch;
    a second optical path configured to carry the data signal between the optical splitter and the optical switch;
    a further optical path between the second transmitter and the optical switch; and
    an outgoing optical path between the optical switch and a remote location;
    wherein:
       the optical network is configured to transmit the control signal and the data signal such that the data signal is incident on the optical switch after the control signal; and
       the optical switch is configured to selectively switch the optical network in accordance with the control signal between:
          a first configuration in which the optical network is configured to transmit at least a portion of the second optical signal to the remote location, via the further optical path and the outgoing optical path; and
          a second configuration in which the optical network is configured to transmit the data signal to the remote location, via the second optical path and the outgoing optical path.

12. The optical network of claim 11, wherein at least one of:
    in the first configuration, the optical network is configured to transmit at least the portion of the second optical signal via the outgoing optical path without transmitting the data signal via the outgoing optical path; or
    in the second configuration, the optical network is configured to transmit the data signal via the outgoing optical path without transmitting at least the portion of the second optical signal via the outgoing optical path.

13. The optical network according to claim 11, wherein the optical switch is a first optical switch, and the optical network comprises:
    a second optical switch;
    a first outgoing optical path configured to carry the control signal between the first optical switch and the second optical switch; and
    a second outgoing optical path configured to carry the data signal between the first optical switch and the second optical switch,
    wherein the optical network is configured to transmit the control signal and the data signal such that the data signal is incident on the second optical switch after the control signal, and the first optical switch is configured to:
       route the control signal to the first outgoing optical path; and
       route the data signal to the second outgoing optical path.

14. The optical network according to claim 11, comprising:
    a first outgoing optical path between the optical switch and a first remote location; and
    a further outgoing optical path between the optical switch and a further remote location,
    wherein:
       in the first configuration, the optical network is configured to transmit the data signal from the optical switch to the first remote location via the first outgoing optical path; and
       in the second configuration, the optical network is configured to transmit the data signal from the optical switch to the further remote location via the further outgoing optical path.

15. The optical network according to claim 14, wherein the second optical path comprises a first core of a first section of a multicore optical fiber, the first outgoing optical path comprises a first core of a second section of the multicore optical fiber, the further outgoing optical path comprises a second core of the second section of the multicore optical fiber, and the optical switch is operable to rotate the first section of the multicore optical fiber relative to the second section of the multicore optical fiber such that:
    in the first configuration, the first core of the first section of the multicore optical fiber is optically coupled to the first core of the second section of the multicore optical fiber; and
    in the second configuration, the first core of the first section of the multicore optical fiber is optically coupled to the second core of the second section of the multicore optical fiber.

16. The optical network of claim 11, wherein the optical network comprises a transmitter configured to:
obtain an input signal comprising the data signal; and
generate the optical signal by modifying the input signal to include the control signal.

17. The optical network of claim 11, wherein the optical switch is configured to selectively switch the optical network from the first configuration to the second configuration based on at least one of: a frequency of the control signal, an amplitude of the control signal, or a pulse code modulation associated with the control signal.

18. The optical network of claim 11, wherein the optical switch is configured to be powered by the control signal, wherein a change in a state of the optical switch is configured to be powered by the control signal, the state comprising at least one of:
a mechanical state or a refractive index of the switch, such that the change in the state of the optical switch switches a configuration of the optical network from the first configuration to the second configuration.

19. The optical network of claim 11, wherein the optical switch comprises a switch which operates via at least one of: a piezo-optic effect, a large elasto-optic effect, or an inverse large elasto-optic effect.

20. The optical network of claim 11, further comprising a light detector configured to detect the control signal, the light detector being operably coupled to the optical switch such that the optical switch switches the optical network from the first configuration to the second configuration in response to a signal from the light detector.

21. The optical network according to claim 11, wherein the first optical path comprises a first optical fiber with a first latency and the second optical path comprises a second optical fiber with a second latency higher than the first latency, wherein optionally the first optical fiber comprises a hollow core fiber and the second optical fiber comprises a single mode fiber.

22. The optical network according to claim 11, wherein the second optical path is longer than the first optical path.

23. A method of configuring an optical network comprising an optical splitter and an optical switch, the method comprising:
splitting, using the optical splitter, an optical signal incident on the optical splitter into at least a control signal and a data signal;
transmitting the control signal to the optical switch via a first optical path between the optical splitter and the optical switch;
transmitting the data signal to the optical switch via a second optical path between the optical splitter and the optical switch, the second optical path being separate from the first optical path and at least one of:
having a higher latency than the first optical path,
being longer than the first optical path, or
including a delay loop,
such that the data signal is incident on the optical switch after the control signal is incident on the optical switch;
transmitting a duplicate of the data signal from the optical splitter to the optical switch via a third optical path, separate from the first optical path and the second optical path; and
using the optical switch, selectively switching the optical network between a first configuration and a second configuration in accordance with the control signal, wherein:
in the first configuration, a data transmission path for transmission of data from the optical splitter to a remote location in the optical network comprises the second optical path; and
in the second configuration, the data transmission path comprises the third optical path instead of the second optical path.

24. The method of claim 23, wherein selectively switching the configuration of the optical network comprises switching the configuration of the optical network from the first configuration to the second configuration in response to the control signal indicating an anomaly in the data signal.

25. The method of claim 23, wherein the optical signal is a first optical signal transmitted by a first transmitter of the optical network, and the method comprises:
with the optical network in the first configuration:
transmitting a second optical signal, using a second transmitter of the optical network, to a remote location in the optical network, via a further optical path arranged between the second transmitter and the optical switch and an outgoing optical path arranged between the optical switch and the remote location;
switching the optical network from the first configuration to the second configuration in response to the control signal indicating that use of the outgoing optical path is requested for transmission of the data signal; and
with the optical network in the second configuration:
transmitting the data signal to the remote location, via the second optical path and the outgoing optical path.

26. A method of configuring an optical network comprising an optical splitter and an optical switch, the method comprising:
splitting, using the optical splitter, a first optical signal transmitted by a first transmitter of the optical network and incident on the optical splitter into at least a control signal and a data signal;
transmitting the control signal to the optical switch via a first optical path between the optical splitter and the optical switch;
transmitting the data signal to the optical switch via a second optical path between the optical splitter and the optical switch such that the data signal is incident on the optical switch after the control signal is incident on the optical switch;
using the optical switch, selectively switching the optical network between a first configuration and a second configuration in accordance with the control signal;
with the optical network in the first configuration, transmitting a second optical signal, using a second transmitter of the optical network, to a remote location in the optical network, via a further optical path arranged between the second transmitter and the optical switch and an outgoing optical path arranged between the optical switch and the remote location;
switching the optical network from the first configuration to the second configuration in response to the control signal indicating that use of the outgoing optical path is requested for transmission of the data signal; and
with the optical network in the second configuration, transmitting the data signal to the remote location, via the second optical path and the outgoing optical path.

27. The method of claim 26, further comprising transmitting a duplicate of the data signal from the optical splitter to the optical switch via a third optical path, wherein selectively switching the configuration of the optical network comprises switching the configuration of the optical network from the first configuration to the second configuration in response to the control signal indicating an anomaly in the data signal, wherein:
- in the first configuration, a data transmission path for transmission of data from the optical splitter to a remote location in the optical network comprises the second optical path; and
- in the second configuration, the data transmission path comprises the third optical path instead of the second optical path.

* * * * *